Figure 1:
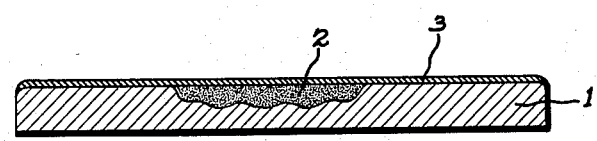

Feb. 7, 1956  C. H. BURCHENAL ET AL  2,733,592

CERAMIC TILE

Filed June 9, 1951

INVENTORS.
Charles H. Burchenal.
Isay Balinkin.
BY Wood, Herron & Evans.
ATTORNEYS.

United States Patent Office 2,733,592
Patented Feb. 7, 1956

2,733,592
CERAMIC TILE

Charles H. Burchenal and Isay Balinkin, Cincinnati, Ohio, assignors to Cambridge Tile & Manufacturing Company, Cincinnati, Ohio, a corporation of Ohio Application June 9, 1951, Serial No. 230,748

2 Claims. (Cl. 72—18)

This invention relates to a novel ceramic tile which is of porous composition, but which is characterized by a low degree of moisture absorption heretofore possessed only by tiles which are substantially or highly vitrified. The tiles of the present invention are adapted to be utilized for structural or decorative purposes, either in outdoor or indoor locations as desired. The invention is directed particularly to a process of fabricating only a single line of multi-purpose ceramic tiles adapted both for indoor and outdoor installation, as desired, in contrast with the separate inventories of special service tiles which manufacturers have fabricated heretofore.

In the tile industry, the amount of moisture which a tile is capable of absorbing, during immersion in water, is accepted as a measure of the degree of vitrification of tile. Tiles capable of absorbing less than .5% by weight of water are classified as impervious; tiles absorbing from .5–3% by weight of water are said to be vitreous. On the other hand, tiles absorbing 3–7% by weight of water are said to be semi-vitreous, and tiles absorbing more than 7% by weight of water are said to be non-vitreous.

Tiles typically employed in bathrooms, kitchens or the like are generally of semi- or non-vitreous composition and possess pronounced hydrophilic properties. They tend to drink up or absorb any moisture that might come into contact with them, apparently by virtue of the pronounced capillary action of the minute interstices and voids with which the body of the tile is permeated. The outer faces of such tiles may carry vitreous glazes which do shed water, but the edges and back face are unglazed, and water, therefore, may enter the body from the edges or back face.

Impervious or vitrified tiles, having a low degree of moisture absorption as just indicated, are always used for outdoor installation in areas where freezing temperatures might prevail. If semi-vitreous or non-vitreous tiles are installed outdoors in such climates, especially in areas where they are exposed to water, the tiles crack or spall, and after a relatively short time become badly deteriorated. This destruction apparently is caused by absorption of water into the tile body, followed by disruptive expansion of the absorbed water when it freezes. The recognized perishability of tile which has absorbed over approximately 3% of moisture when exposed to freezing conditions has led the industry to maintain a sharp line of differentiation between indoor and outdoor tiles. At present, manufacturers commonly make and stock distinctly separate inventories of semi- or non-vitreous tiles for indoor purposes and vitreous or impervious tiles for outdoor purposes. To avoid needless repetition in the remainder of this specification, semi-vitreous and non-vitreous tiles are designated as porous tiles, while impervious and vitreous tiles, as previously defined, are designated as non-porous tiles.

Porous tiles, for interior purposes, sell at a lesser price than vitreous, or frost-proof tile for outdoor installations because it is far easier to manufacture. Such products can be manufactured satisfactorily from a variety of earth or clay mixtures, and may be fired satisfactorily at moderate temperature. Also, a wide variety of glazing compositions are available which have expansion characteristics matching those of the tile body itself. Hence, the problem of manufacturing glazed non- or semi-vitreous tiles is not difficult.

In contrast, the fabrication of non-porous tiles involves a number of difficulties. First, the glassy components which are required in the ceramic formulation of such compositions cause the tiles to warp during firing and to shrink unevenly, especially when tiles are not subjected to uniform firing temperatures. Variations in pressing also cause substantial variations in the ultimate tile shape. In addition, larger percentages of flux components are required and the range of glazes which match the body compositions as to expansion characteristics is rather narrow. Also, in a two-fire process of manufacturing tiles, some difficulty is encountered in the confinement of the glazes to the face surface only of the tile. For these various reasons, the loss through production of imperfect tiles is much higher than in the manufacture of porous ware, and the price of the non-porous tile pieces which do pass inspection inherently is higher.

It is apparent that a tile manufacturer who wishes to produce a full line of wall and floor tile for both indoor and outdoor purposes must maintain complete separation of supplies within his plant, virtually operate two distinctly different lines of production, and maintain two distinctly separate inventories of finished porous and non-porous wares for sale at different base prices. The principal objective of this invention has been to provide a process by which a tile manufacturer may produce only one line of tile which is characteristically non-porous from the point of view of cost and composition, but which displays, in service, the low moisture absorption which heretofore has been characteristic only of frost-proof, non-porous ware.

In addition, an important objective of the present invention has been to provide tiles which do not require soaking in water prior to installation. Heretofore, it has been conventional and requisite for the tile setter to immerse indoor tile in water prior to application of the tile to the cement upon the wall or floor in which the tile is to be set. This soaking is necessary in order that the inherent thirst for water of porous tile may be satisfied prior to installation. The cements usually employed for setting tile are mixtures of water, sand, and binder, such as Portland cement, which harden or set through chemical hydration of the binder by the water in the mixture. When dry porous tile is applied to such a cement, or when such a cement is applied to dry tile as in grouting, the thirsty tile robs water from the cement to such an extent that the binder is incapable of becoming properly hydrated, and therefore, the tile is not properly bonded by or to the cement. On this account it has been standard practice in the past for a tile setter to soak non-vitreous tile in water before setting it in place in order that the tile will not deprive the cement of water necessary for physical and chemical hardening of the cement. Presoaking of indoor tile prior to its application has always been a nuisance and an inconvenience, both on account of the messiness and the extra labor it entails.

This invention contemplates a method for producing tiles which may be used indiscriminately for either indoor or outdoor installations, regardless of freezing conditions, but which also may be set in the ordinary water-mix cements of the type conventionally employed in setting indoor tile. Such a product is fabricated in accordance with the present invention by first producing a porous tile and then by reducing its hydrophilic properties to the extent that it becomes substantially as non-absorbent as a vitreous or impervious tile, through treatment of the interstices and voids of the tile with a hydrophobic silicone oil such as dimethyl siloxane.

An organo-silicon compound of this type, when distributed throughout the interior of the tile body, renders the tile virtually non-water absorbent, and, if desirable, may be utilized to reduce the water absorbing capacity of the tile to below 3% which, by industry definition is the upper limit of absorption for tile intended to be used for outdoor installations. Moreover, such a result may be obtained without filling or even approximately filling the voids and interstices distributed and dispersed throughout the tile body. Otherwise expressed, the distribution of a small amount of silicone throughout the pores in a porous tile body alters the natural hydrophilic characteristics thereof and renders the body relatively hydrophobic. Therefore, the finished product, while having a moisture absorption characteristic of a non-porous or fully vitrified tile, has surface voids and openings similar to those of a semi- or non-vitreous tile and does not possess the glassy qualities of an impervious or vitreous product. Most peculiarly, though moisture is repellent to a substantial degree, the tiles of the present invention may be set in water-mixed cement just as though they were conventional products, but no presoaking is required.

In the practice of the invention, the hydrophobic silicone oil may be applied directly to the tile surface without dilution, but in the alternative, the silicone oil may be applied in a diluted state, as solution or suspension, in a vehicle or solvent. The latter procedure capitalizes upon the very hydrophilic property of the tile which is to be destroyed by the treatment. Thus, the hydrophobic silicone oil is preferably dispersed in water, in a fine state of suspension, so that when the tile is soaked in the fluid and drinks it in, the suspended silicone penetrates the body along with the water to the interior recesses. The quantity of silicone oil in the dispersion may be from approximately ½ to 50% by weight, preferably from ½ to 5% by weight.

The suspension of silicone in water is so constituted that the dispersed silicone particles are small, and the suspension is made very dilute, for instance, 1% by weight of silicone to 99% by weight of water. In addition, permeation of the silicone is augmented, by "curing" the tile after the treating agent has been applied to it, by elevating the tile temperature with the glaze uppermost in relation to the body. The significance of properly positioning the tile during curing is discussed in more detail at a later point in the specification.

By soaking the tile in a solution or suspension of an oily, hydrophobic silicone polymer, substantial penetration is achieved quickly and conveniently. While the amount of silicone oil entering the tile is small in relation to the weight of the water absorbed, or the volume of the voids, or the weight of the tile, still, enough is introduced to provide the degree of repellency desired.

The following example illustrates a typical practice of the invention:

A body composition suitable for the production of conventional semi- or non-vitreous tile is mixed, pressed, fired and glazed in the usual manner, either in a one-fire or two-fire process. After firing, the glaze will appear on only one face of the tile, as is usual. The glaze, of course, is impervious, but the pores of the body are open at the back face of the tile and at the edges. This product is next made hydrophobic. This is accomplished preferably by immersing the tile in a ½ to 5% by weight aqueous solution of dimethyl siloxane, the period of immersion being sufficient to allow penetration of the aqueous dispersion to the interior of the tile to the extent desired, for example, approximately 5 to 10 minutes. Following this treatment, water is expelled from the tile, as by heating the tile at an elevated temperature for a period of time sufficient to eliminate all or most of the water from the tile body.

Thermal decomposition of the silicone is, of course, to be avoided during curing. In this respect, it is to be noted that both time and temperature have a bearing upon silicone decomposition. Thus, a given silicone oil may survive exposure to a relatively high temperature for a short period of time while the same oil may be decomposed, or its ability to confer hydrophobic properties may be impaired if it is subjected to a substantially lower temperature for a longer time. In general, we have obtained satisfactory results in curing tile at temperatures of 300° F. for as long as five hours, at 800° F. for as long as one-half hour, or under other time temperature conditions which are intermediate these just given. The curing temperature and time thus may be altered to suit the desired production rate and the oven capacity which is available.

The position of the tile while it is being dried or cured peculiarly affects the extent to which the body becomes moisture-repellent. Specifically, we have discovered that if the tiles are exposed to heat for drying or curing when the glaze is uppermost or surmounts the body, then each piece will be rendered moisture-repellent uniformly throughout substantially its entire cross section. If the glaze is down, or if the tiles are stood on edge, then portions of the tile may remain unaffected by the treatment even though the concentration of solution and period of immersion were the same as in the other case. Under drying or curing heat, the treating solution appears to migrate upwardly and the glaze is capable of acting to prevent its escape.

In order to determine which portions of the tile body are moisture-repellent and which remain moisture-receptive after treatment, a so-called ink or "stain" test may be employed, according to which a piece of tile is fractured into two pieces and then immersed in ordinary writing ink or other suitable stain. One of the pieces, after short immersion in the ink, is then held in running water. The stain readily washes away from the repellent or non-absorbent portions of the tile body, but is retained by the non-repellent portions. Thus, an examination of the condition of the tile with respect to moisture absorption can readily be made by merely looking at the cross section of the fractured piece to see whether or not any ink remains after washing. If the ink is absorbed, a sharp line of demarcation appears delineating the absorbent portion of the tile from the non-absorbent portion. By means of this test, the success or extent of the treatment can readily be determined.

Figure 2:
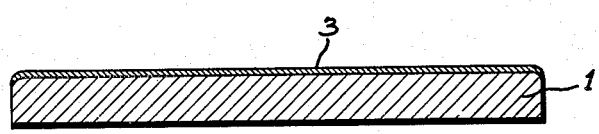

In the accompanying drawing, Figure 1 illustrates the cross-sectional appearance of a piece of tile which is moisture-repellent in the lightly hatched area indicated generally at 1, but which is not moisture-repellent in the dark or stained area indicated at 2. The glazed surface of the tile is indicated at 3. A result similar to that shown in Figure 1 is apt to be obtained if the tile is cured with the glaze face down or with the tile on edge. Figure 2 illustrates a similar section in which no area is stained and which, therefore, is repellent throughout its entire cross section. Such a result is reliably obtained when the piece of tile is dried or cured face up.

The depth to which hydrophobic properties are conferred upon the tile, in respect to its thickness or cross section, may also be governed by varying the time during which the tile is immersed in the treatment solution, or by governing the pressure under which the treatment solution is forced into the tile. Ordinarily, exposure of the tile to the treating fluid under atmospheric pressure for a matter of approximately five minutes is usually sufficient. Immersion for a lesser period of time permits partial penetration of the treating reagent into the tile for a short distance inwardly from the exposed surfaces, but for some purposes, only partial penetration is all that is required. For instance, the need for presoaking porous tile may be entirely eliminated by causing the treating solution to penetrate only part way through the tile, provided that the product produced in this manner is to be used for indoor installations. Thus, complete penetration throughout the entire cross sectional area of the body in all directions is not requisite provided the marginal edgewise and exposed face portions are repellent and provided such tile is not to be cut, for installation, through an area which will expose a non-repellent portion. For general purposes, it is obvious that complete repellency throughout the entire cross section is most desirable. The difference between hydrophilic tile and tile rendered hydrophobic in accordance with the present invention, is not visually discernible and, of course, a tile setter cannot be expected to make ink tests at the time of installation to be sure that cut pieces meet repellency requirements.

It is also to be noted that various body compositions may display similar moisture absorption characteristics yet different capacities to imbibe the silicone oil treating fluid. Some body compositions, therefore, display preference for absorbing the hydrophobic silicone oil from the solution, and in such event, the treating bath during a production run gradually becomes depleted unless additions of silicone oil are made from time to time to maintain the desired working concentration. In other words, the working concentration should be uniform and may be as low as 1% by weight or as high as 35-55% by weight.

Once applied to semi-vitreous tile, the silicone apparently becomes an integral part of the ceramic composition, the tile displaying continued water repellency even though stored for long periods of time. It is apparent that the quantity of silicone absorbed by tile is wholly inadequate to fill the voids, pores and interstices in the manner in which traditional waxes and similar impregnants sometimes function. Thus, since the total quantity of silicone is so small, the cost of the treatment is low in comparison to the cost of manufacturing vitrified tile or to the cost of presoaking. Peculiarly, the strength of tiles treated in accordance with the present invention is increased by approximately 10%.

Dimethyl siloxane polymer is disclosed herein as a typical silicone oil adapted for the practice of the invention, but this composition is disclosed by way of illustration only, and those skilled in the art readily will recognize various other oily, hydrophobic organo-silicon compounds and organohalide-silicon compounds which are adapted to be used as alternatives. Thus, methyl-chlorosilane and both the various halide aryl and alkyl silicones are satisfactory. It is to be appreciated that the name silicone is a generic name for a number of materials, including oils, resins and elastomers. For use in the practice of the present invention, the oily compounds, whether linear in molecular structure, or cyclic and linear, are most convenient to apply.

Preferably, though not necessarily, dispersion of the silicone is accomplished by emulsifying the silicone with water to obtain a fine suspension. In the alternative, however, the silicone may be dissolved in a suitable organic solvent which, in turn, may be suspended in water. As a still further modification, the fluid medium used for treating the tile may consist of a solution of silicone in solvent, but inasmuch as volatile organic solvents are required to dissolve silicone, such practice may entail vapor recovery or fire and toxic hazards, and therefore, is more expensive and less convenient than water suspensions of the types previously discussed.

Having described our invention, we claim:

1. A building tile comprising a porous body having a plurality of faces, the body comprising a semi-vitreous ceramic composition containing voids and capillary openings, at least one of said faces having a glazed surface, said tile body being initially capable of absorbing more than about 3% of its weight of water, said tile body having a water-repellent silicone oil distributed upon the surface of the voids and capillary openings, the amount of said silicone oil being insufficient to plug the voids and capillary openings but sufficient to render the tile body incapable of absorbing more than about 3% by its weight of water.

2. The building tile set forth in claim 1 in the form of a substantially flat plate having a glaze on one face thereof.

References Cited in the file of this patent

UNITED STATES PATENTS

| 417,233 | Crull | Dec. 17, 1889 |
| 2,017,318 | McCoy | Oct. 15, 1935 |
| 2,392,805 | Biefeld | Jan. 15, 1946 |
| 2,443,067 | Burns | June 8, 1948 |
| 2,507,200 | Elliott | May 9, 1950 |
| 2,541,838 | Shardlow | Feb. 13, 1951 |

OTHER REFERENCES

Dow-Corning Silicone Note Book Fluid Series No. 3, Sept. 1948, pages 2, 3 and 10.